US012637936B2

(12) United States Patent
Ellithorp

(10) Patent No.: US 12,637,936 B2
(45) Date of Patent: May 26, 2026

(54) COMBINED GAS SEPARATION ASSEMBLY

(71) Applicant: Blackjack Production Tools, LLC, Oklahoma City, OK (US)

(72) Inventor: Brian Ellithorp, Edmond, OK (US)

(73) Assignee: Blackjack Production Tools, LLC, Oklahoma City, OK (US)

( * ) Notice: Subject to any disclaimer, the term of this patent is extended or adjusted under 35 U.S.C. 154(b) by 78 days.

(21) Appl. No.: 18/626,066

(22) Filed: Apr. 3, 2024

(65) Prior Publication Data

US 2024/0247576 A1 Jul. 25, 2024

Related U.S. Application Data

(63) Continuation-in-part of application No. 18/353,285, filed on Jul. 17, 2023, now Pat. No. 12,297,731, which is a continuation of application No. 17/846,180, filed on Jun. 22, 2022, now Pat. No. 11,702,921.

(60) Provisional application No. 63/494,145, filed on Apr. 4, 2023, provisional application No. 63/213,544, filed on Jun. 22, 2021.

(51) Int. Cl.
*E21B 43/38* (2006.01)
*B01D 19/00* (2006.01)

(52) U.S. Cl.
CPC .......... *E21B 43/38* (2013.01); *B01D 19/0057* (2013.01)

(58) Field of Classification Search
CPC ........................................ E21B 43/38
See application file for complete search history.

(56) References Cited

U.S. PATENT DOCUMENTS

| | | | |
|---|---|---|---|
| 4,481,020 A | 11/1984 | Lee et al. | |
| 4,900,433 A | 2/1990 | Dean et al. | |
| 5,902,378 A | 5/1999 | Obrejanu | |
| 6,036,749 A | 3/2000 | Ribeiro et al. | |
| 6,723,158 B2 | 4/2004 | Brown et al. | |
| 6,932,160 B2 | 8/2005 | Murray et al. | |
| 9,045,979 B2 | 6/2015 | Cobb et al. | |
| 9,518,458 B2 | 12/2016 | Ellithorp et al. | |
| 9,909,400 B2 | 3/2018 | Ellithorp et al. | |
| 10,731,452 B2 | 8/2020 | Ellithorp | |
| 11,131,180 B2 | 9/2021 | Ellithorp | |
| 11,702,921 B2 | 7/2023 | Ellithorp | |
| 12,024,990 B2 * | 7/2024 | Brown ................... | F04D 13/10 |

(Continued)

FOREIGN PATENT DOCUMENTS

| | | | | |
|---|---|---|---|---|
| CA | 2207770 C | * 11/2001 | ......... | B01D 19/0052 |
| CA | 3017692 A1 | * 3/2019 | ............. | F04B 47/12 |

(Continued)

*Primary Examiner* — Catherine Loikith
(74) *Attorney, Agent, or Firm* — Tomlinson McKinstry, P.C.

(57) ABSTRACT

A separator assembly having multiple separation devices for use in a wellbore. The first separator device is a spiral separator, which ingests gas and liquid from the wellbore and separates them using centrifugal force caused by the stroke of a pump. Liquid is ingested at a pump inlet and gas is vented back to the annulus. The second separator device, just uphold from the first separator device, is a multi-stage separator. This separator decreases the velocity through and past the separator, allowing liquid to fall out in each isolated stage, where it is ingested to a central tube at a port.

19 Claims, 9 Drawing Sheets

(56)  References Cited

U.S. PATENT DOCUMENTS

| | | |
|---|---|---|
| 2011/0048696 A1 | 3/2011 | Holte |
| 2017/0266586 A1 | 9/2017 | Hopper |
| 2020/0080408 A1 | 3/2020 | McCoy |
| 2020/0141223 A1 | 5/2020 | Brown et al. |
| 2020/0291762 A1* | 9/2020 | Ellithorp ................. E21B 17/18 |
| 2021/0404311 A1 | 12/2021 | Ellithorp |

FOREIGN PATENT DOCUMENTS

| | | |
|---|---|---|
| WO | 2019035893 A1 | 2/2019 |
| WO | 2020185894 A1 | 9/2020 |

* cited by examiner

COMBINED GAS SEPARATION ASSEMBLY

SUMMARY

The present invention is directed to a separator assembly for use in a wellbore. The separator assembly comprises a first separator and a second separator. The first separator is disposed between a first tube and a second tube and comprises a spiral ramp. The spiral ramp is configured to separate a first gas portion and a first liquid portion of a wellbore fluid, place the first liquid portion into the first tube, and release the gas portion to a position outside the second tube.

The second separator is disposed between the first tube and the second tube. The second separator comprises a plurality of stages, wherein each stage is separated by a barrier, the barrier preventing flow between each of the plurality of stages. Each of the plurality of stages is configured to separate the wellbore fluid into a second gas portion and a second liquid portion.

The present invention is directed to a separator apparatus for use within a wellbore. The apparatus comprises a first tube, a housing, a first helical ramp, and a second helical ramp. The first tube has an inlet port, wherein the first tube is in communication with a pump. The housing surrounds the first tube to form a first annular region. The housing comprises a first outer port and a second outer port which are configured to allow fluid communication between the first annular region and a second annular region defined outside of the housing. The first helical ramp is disposed within the first annular region and defines a first end and a second end. The first end is proximate the first outer port. The second helical ramp is disposed within the first annular region. The second helical ramp defines a first end and a second end wherein the first end is proximate the first outer port.

The annular region is defined by a first, second and third flow path. The first flow path begins at the first outer port, which is bounded in part by the first helical ramp and the second helical ramp. The second flow path begins at the second end of the second helical ramp and is bounded in part by the first helical ramp and the second helical ramp, and ends at the second outer port. The third flow path is bounded in part by the first helical ramp and ends at the inner port.

BRIEF DESCRIPTION OF THE DRAWINGS

In FIG. 8, fluid flow is shown using solid arrows and gas flow is shown using hollow arrows. In regions where different arrows exist, flow may be understood to be two-phase, or gas and liquid may be co-extant as a foam or slurry. Flow of both the liquid and the gas should be taken as general, and may vary at different times depending on conditions in the wellbore and the stroke of the pump, and its application of pressures through the dip tube.

DETAILED DESCRIPTION

In most forms of gas separators used for pumping a multi-phase solution of oil, water, and gas for separation, the solution is typically ingested through the separator's intake slots upon the pump's positive upstroke action. See, e.g., U.S. Pat. No. 9,518,458, issued to Ellithorp, et al., the contents of which are incorporated by reference herein.

In prior solutions, a single flow path could be used to separate the solution. As the solution is pulled down into the gas separator's mud anchor, the gas present in that area of the separator is anticipated through design to be incapable of reaching the lower-most intake of the dip tube. The dip tube or gas anchor length and its lowermost intake point is driven by anticipated worst-case scenario of the highest fluid volume intake possible and then the length of the "dead space" within the length is elongated even further to protect against gas ingestion upon the following strokes.

When gas is pulled into the mud anchor and ultimately into the pump, it is typically due to the fluid ingestion rate—the pace of liquid drawdown in the separator's "dead-space" is faster than the gas's ability to escape the solution. As a result, whatever volume of gas is unable to fully escape through the separator's upper intake slots during the pump's downstroke (i.e., when the pump is not ingesting anything or pulling liquids through the system) is subject to be pulled down through the unit's dead space again.

In addition, the newly ingested gas of the multi-phase solution may be similarly pulled, before possibly being forced into the gas anchor intake upon successive strokes. This result is extremely undesirable since it causes significant gas interference in the pump stroke and what is referred to as "incomplete pump fillage" which may lead to a variety of costly system failures that require remediation. With proper monitoring you will see dynamometer information exhibiting "gas interference cards" where the pump is indicated to be anywhere from less than absolutely full and more commonly very incomplete due to the pump chamber being heavily full of gas rather than the desired liquids only.

Figure 8:
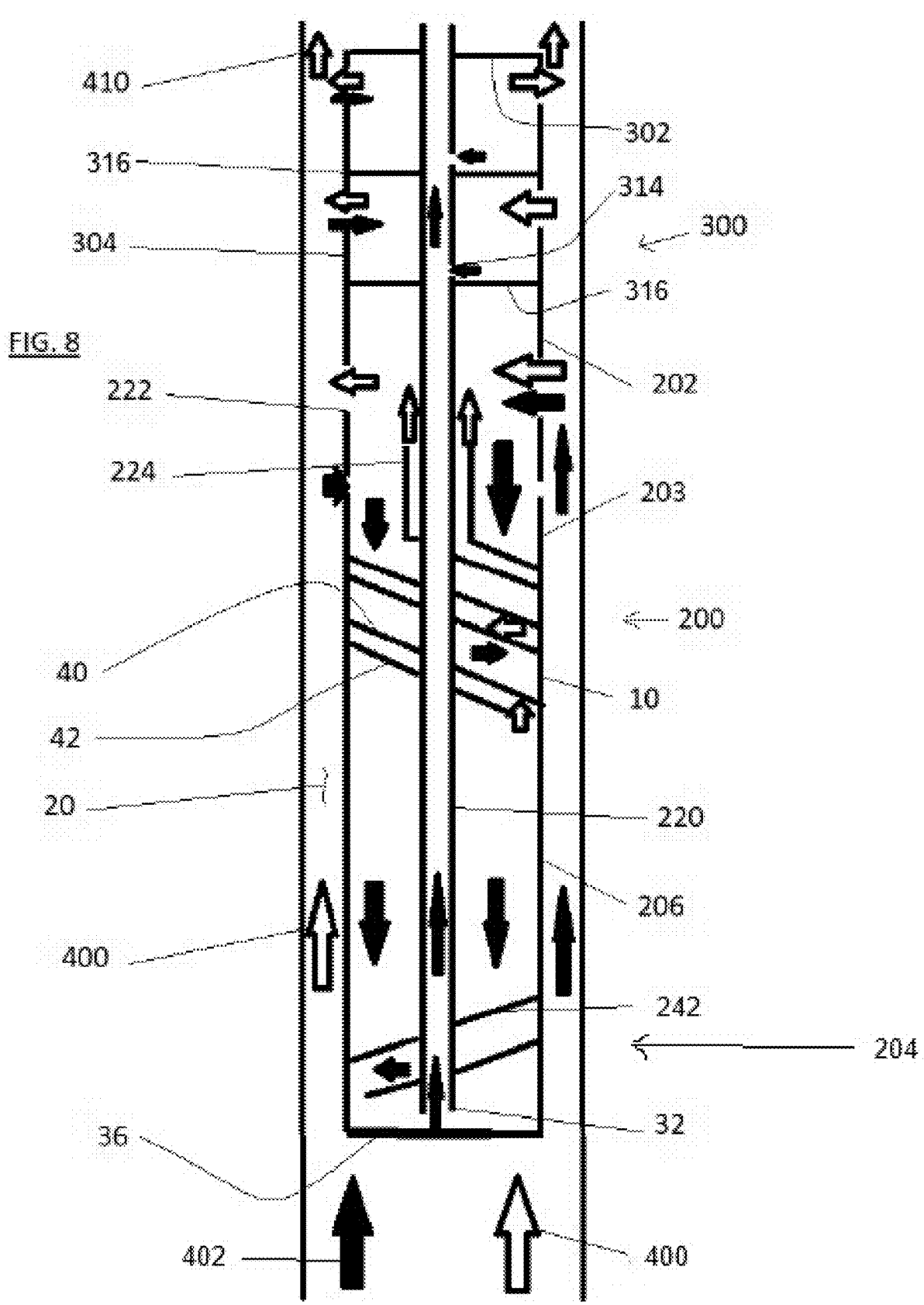
FIG. 8 is a diagram, not to scale, of an entire separator string, including the dual-stage separator, the spiral separator, and a sand separator assembly.

With reference to the provided drawings, a stacked-helical separator 10 is shown, both alone, and in conjunction with a larger, combined separator assembly 200 (FIG. 8). The separator 10 is typically installed in a wellbore 12 having an uphole direction 14 and a downhole direction 16. The wellbore 12 may be defined by an outer casing that seals the area of the separator 10. The separator 10 is further installed in an inner casing or housing 18 which is surrounded by the wellbore 12. The space between the wellbore 12 and the housing 18 is referred to herein as the outer annulus 20.

The housing 18 has one or more lower ports 22 to provide access between the interior section of the housing 18 from the outer annulus 20. The one or more lower ports 22 function as the beginning of a first flow path 100 of the separator 10.

Figure 1:
FIG. 1 is a side view of a separator for use in the present invention. The separator is within a housing that is within a wellbore. A truncation at the top of the Figure indicates that other apparatus may be included in an uphole direction prior to connection to a production tooling string. For example, pipe may be attached to an uphole end.
Figure 2:
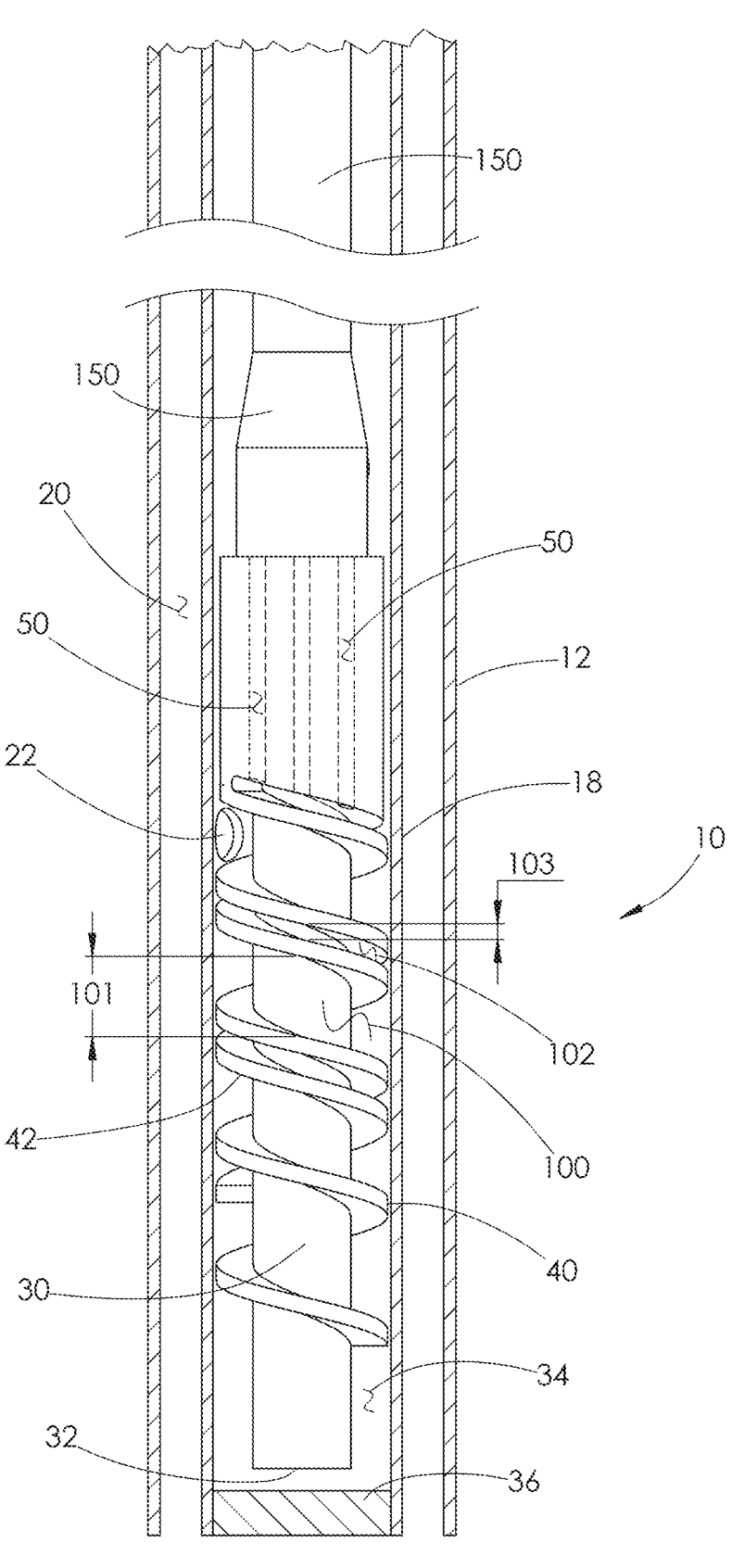
FIG. 2 is a side view of the separator of FIG. 1, taken from the left side of the separator from FIG. 1. A gap between first and second helical ramps is shown on the left side of the separator. A truncation at the top of the Figure indicates that other apparatus may be included in an uphole direction prior to connection to a production tooling string.
Figure 3:
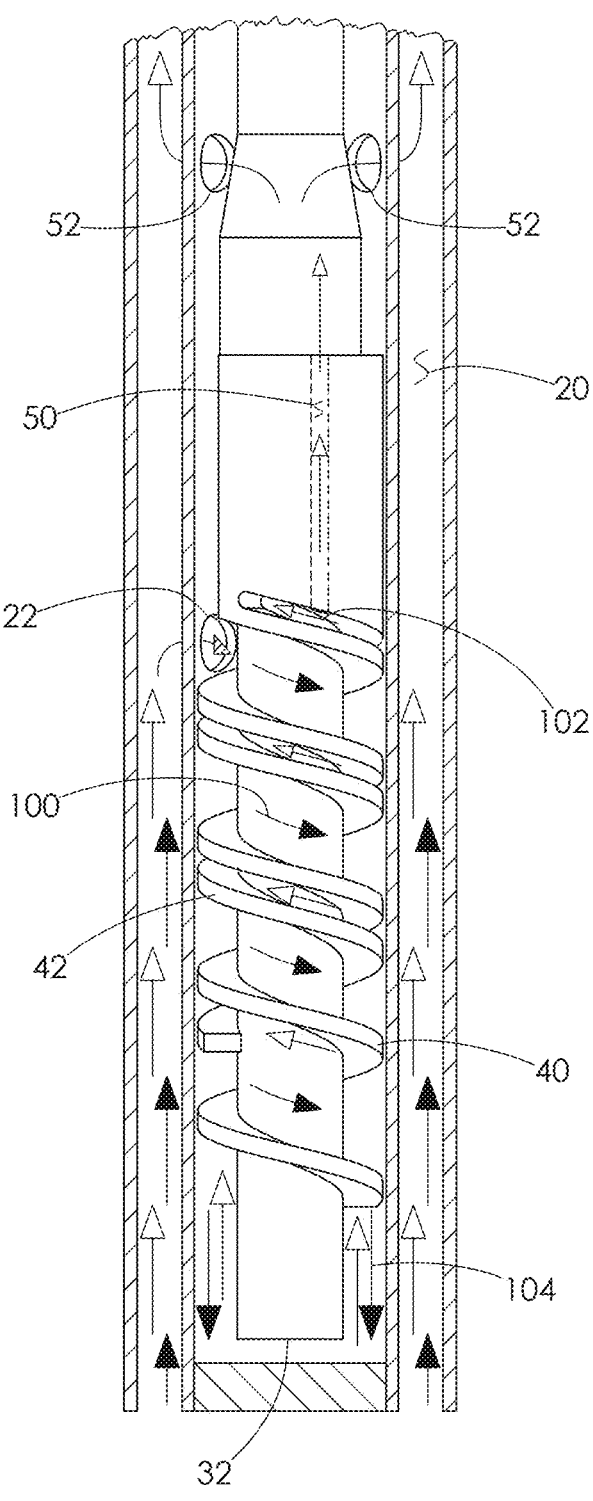
FIG. 3 is a diagrammatic representation of the flow pattern of the gas and fluid within the separator. The separator is shown inside of the housing, which is itself within a well casing. Striped arrows represent gas flow and solid arrows represent liquid flow. The arrows are shown entering the housing at first ports, and a striped arrow is shown exiting the housing at second ports. A truncation at the top of the Figure indicates that other apparatus may be included in an uphole direction prior to connection to a production tooling string.

With reference now to FIGS. 1-3, the separator 10 is connected to and part of a production tooling string 150. The separator 10 has an inner tube 30 which is in fluid communication with a pump assembly, which may be a part of the separator or may be uphole along the production tooling string. The inner tube 30 has a pump inlet 32 at an end of the tube. Fluid entering the interior section of the housing 18 from the one or more lower ports 22 falls toward the pump inlet 32 due to the localized lower pressure area created by the strokes of the pump. The pump inlet 32 is in a downhole direction from the one or more lower ports 22. From the lower ports 22 to the pump inlet 32, fluid is confined to an inner annular space 26 formed between the tube 30 and the housing 18.

The separator 10 comprises a first helical ramp 40, which is attached at one side to the inner tube 30 and on an opposite side abuts an inner surface of the housing 18. It is preferable that the first helical ramp 40 prevents the migration of fluid and gas across its surface, thus providing a restricted path through the inner annulus 26 for fluid and gas. The first helical ramp 40 terminates within a dead space area 34 of the separator 10, proximate the pump inlet 32. One of skill in the art will understand that the "dead space" area 34 refers to a relatively large volume region near the inlet where liquid is pulled into the inner tube 30. As shown, the "dead space" 34 is bounded on a downhole 16 side by a barrier 36, though a sand separator, or desander 204 (FIGS. 6A, 8) or other apparatus may be placed here for further processing of the liquids prior to ingestion at the pump inlet 32.

The separator 10 further comprises a second helical ramp 42. The second helical ramp 42 is attached at one side to the inner tube 30 and on an opposite side abuts an inner surface of the housing 18. It is preferable that the second helical ramp 42 prevents the migration of fluid across its surface, and provides a restricted path through the inner annulus 26 for fluid.

The second helical ramp 42 terminates at a location uphole from the termination of the first helical ramp 40. A gap 44 between the first helical ramp 40 and the second helical ramp 42 at the terminus of the second helical ramp 42 allows access to a separate outflow channel, a second flow path 102 for the gas that has entered the dead space area 34.

As shown in the figures, when the pair of helical ramps 40, 42 are closest, the first helical ramp 40 is the upper ramp, and the second helical ramp 42 is the lower ramp. The gap 44 maybe approximately 0.3", and may remain constant over the course of the entire second helical ramp 42, resulting in a course having a constant height 103. Alternatively, the gap 44 maybe wider than other portions of the second flow path 102, resulting in a variable height 103. The first flow path 100 is located within a course which is formed by the first 40 and second 42 helical ramps, and has a height 101. Preferably, the height 101 of the first flow path 100 course is larger than that of the height 103 of the second flow path 102 course.

Material entering the separator upon an intake stroke of the pump at the first port 22 will thus enter the first flow path 100. Material may then follow the first flow path along a path which may make revolutions around the inner tube 30, imparting centrifugal force to the material and encouraging separation of gas from within the material. Preferably, the first flow path 100 makes two to three revolutions prior to the end of the second helical ramp 42. The first helical ramp 40 may make one or more additional revolutions prior to terminating at the dead space area 34. The path of the liquid material through the dead space area 34 into the pump inlet 32 and up the tube 30 is referred to as a third flow path 104.

Alternatively, a gap in the second helical ramp 42 may exist for forty five degrees or so of the rotation of the ramp, allowing a region for gas to enter the second flow path 102, before the second helical ramp continues to follow the first helical ramp 40. Multiple gaps may therefore be used to provide gas capture from multiple points into the same flow path 102.

This helical path will create a forced gas separation to occur due to the velocity generated and the centrifugal effects created as the multi-phase mix pulls downward through the helical course of the first flow path 100 and further down through the bottom single helical section. Upon the pump reaching its downstroke and any further drawdown of the solution that was pulled through the helical section ceases. Gas that has also coalesced at this point, will then travel rapidly upward along the underside of the first helical ramp 40 until reaching the gap 42. Gas will then be "caught" within the second flow path 102.

Figure 6A:
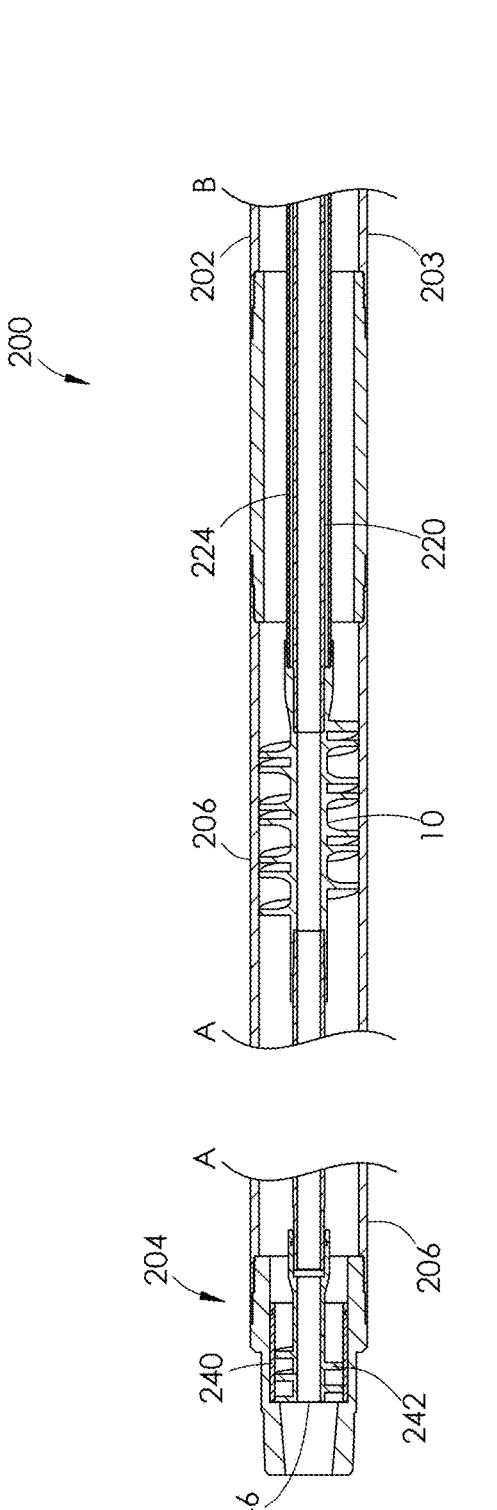
FIG. 6A is a sectional side view of a combined spiral separator assembly for use with the present invention. Slots 222 should be understood to be formed in the outer housing, not the dip tube 220. "Uphole" is to the right in FIG. 6A, and should be understood to be truncated, with the dual-stage separator assembly of FIG. 7 just "uphole". The apparatus is truncated for length with excised portions between lines A-A and lines B-B.
Figure 6A:
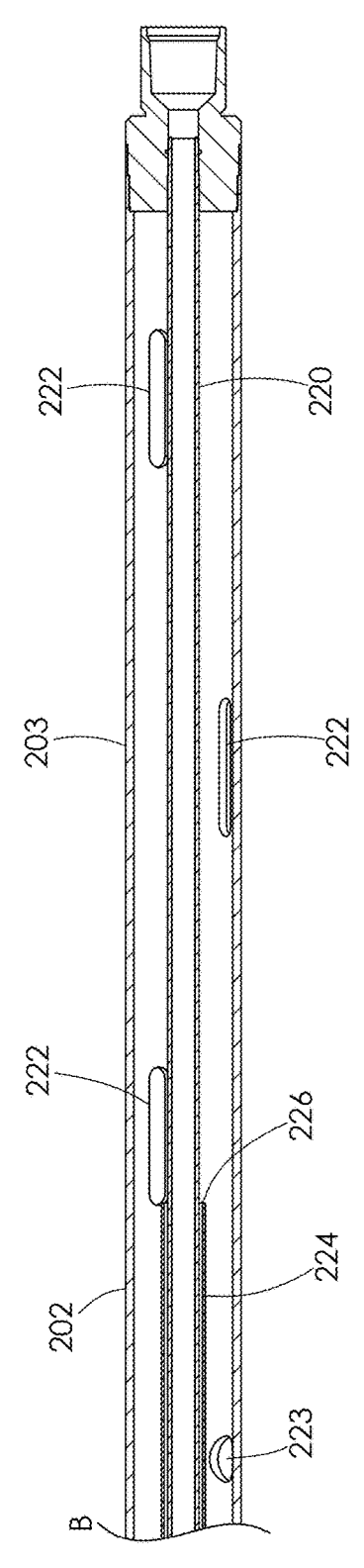

The separator 10 provides one or more bypass channels 50 which parallel but do not communicate with the interior of the inner tube 30. In FIGS. 1 and 2, there are multiple such bypass channels 50 shown. In FIG. 3, one channel 50 is shown. In any case, the bypass channels 50 are in communication with and form part of the second flow path 102. Gas which enters the helical course of the second flow path 102 may proceed unimpeded, before entering the bypass channels 50. The gas is allowed to flow upward freely to one or more second ports 52 formed in the housing 18, where the gas is allowed to discharge into the first annulus 20, where it proceeds in the uphole direction 14 through the annulus 20 of the wellbore 12. In FIG. 6A, these second ports 52 are in the form of slots 222 in a separator assembly 202, which is just uphole of the spiral separator 10.

These bypass channels 50 maybe quite long, and for example, may be fourteen to seventeen feet apart from the spiral separator 10. The gas can be released into the annulus above all separation apparatus, allowing the gas to flow upward at its desired pace, unimpeded by any fluids. Alternatively, in the apparatus shown in FIGS. 6A and 6B, the bypass channels 50 may terminate in an intermediate vent tube 224 within a separate separator unit 202. The second flow path 102, from the gap 44 to the second ports 52, provide a dedicated path free of the drawdown pace of any fluid.

Liquid material, having been separated from the gas by the helical course of the first flow path 100, forms a third flow path which is defined by accumulating within the dead space 34 and entering the inner tube 30 at the pump inlet 32 for pumping through the tube 30. Liquid material is pumped out of the wellbore 12 through a production tubing string. The liquid material in the third flow path may be sent through a sand separator 204 (FIG. 6A), such that solids may drop out before entering the pump inlet 32.

This is distinguished from other forms of gas separation which have no way of capturing the outflowing gas and keeping it from flowing in an opposed direction to the next ingested fluid mix. Other solutions incorporate a very vertically oriented blade set that is intended to allow the upward flowing gas bubbles to hit the blade undersides and then flow upward in a more organized fashion upward to the discharge section, but this by no means allows a contained or unimpeded channel for this outflow function.

The function of the spiral separator 10 is best seen in FIG. 3. In FIG. 3, gas, represented by a striped arrow, and fluid, represented by a solid arrow, enter the housing 18 of the separator 10 at the lower first ports 22 represented by the large, curved arrow. This two-phase flow travels, together, down first flow path 100—the larger portion of the helical. However, as the mixture spins, gas and liquid will tend to become separated. While liquids will tend to continue down the larger helicals towards the dead space 34 and pump entrance 32 along the third flow path 104, gas will want to travel back up. The gas will, as a result, be caught against a bottom side of the helical before being caught in the gap 44, and will travel up through the separator 10 via the second flow path 102.

Reaching the top of the helical ramps 40, 42 of the separator 10, the gas will enter a separated chamber and the bypass 50, and then escape through the upper second ports 52 and into the outer annulus 20 of the wellbore 12.

Figure 4:
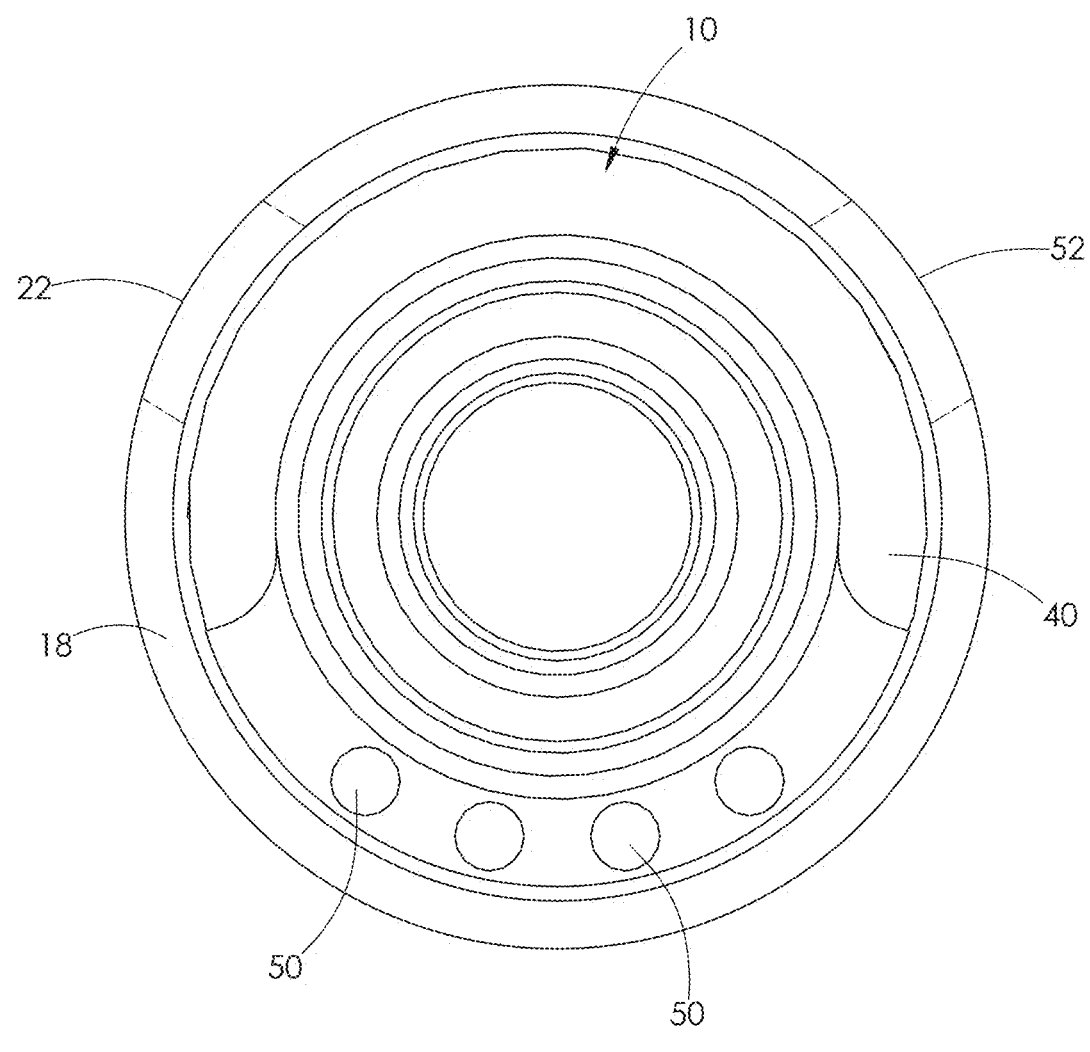
FIG. 4 is a top view of the separator of FIGS. 1-3.

FIG. 4 shows a top view of the separator 10. One of the lower first ports 22 is shown in small brackets to represent the region at which the multi-phase solution passes through the housing 18 and into the separator 10 body. The first helical ramp 40 is shown from the top in FIG. 4. The second helical ramp 42 is disposed fully beneath the first helical ramp 40 and therefore is not visible. Four bypass channels 50 are shown, a part of the second flow path 102. Isolated from the channels is the inner tube 30, by which liquids are pumped to the production tooling string.

Figure 5A:
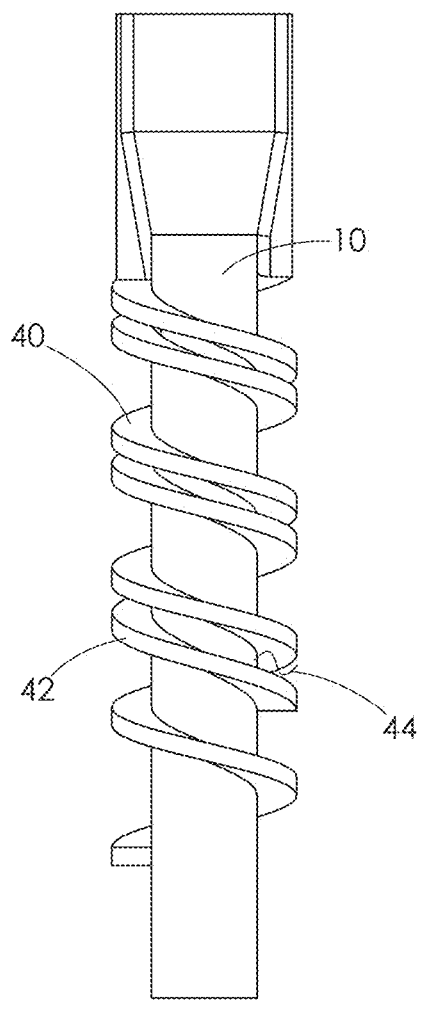
FIG. 5A is a side view of the separator of FIG. 1, taken from the right side of the separator of FIG. 1. The housing and wellbore are removed from FIG. 5A.
Figure 5B:
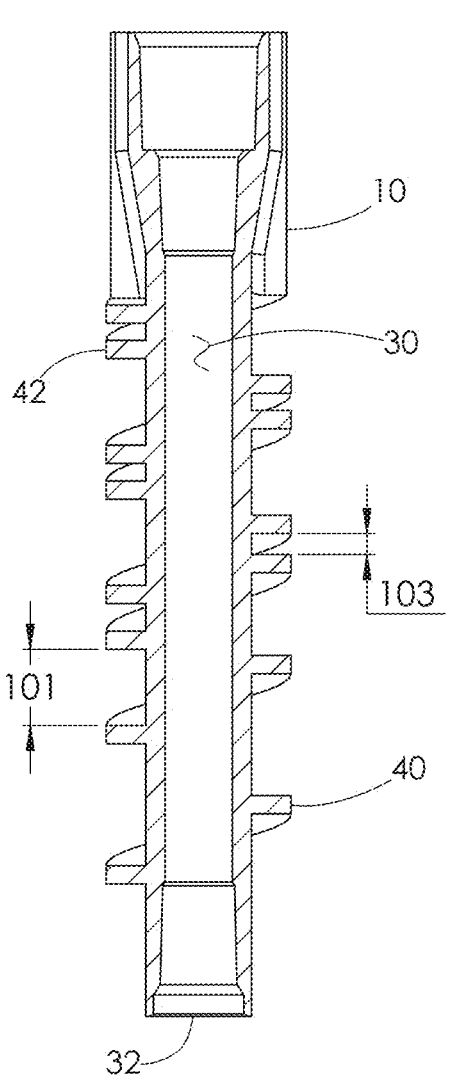
FIG. 5B is a sectional view thereof, taken from a vertical plane passing through the center of the separator and parallel to the image of FIG. 5A.

FIGS. 5A and 5B demonstrate the geometry of the separator 10. In FIG. 5A, the separator is shown from the side. FIG. 5B is a sectional view of the separator 10 of FIG. 5A. In this embodiment, the vertical height 103 of the second flow path 102 increases as the first and second helical ramps 40, 42 approach the gap 44 (not shown in FIG. 5A). The bypass channels 50 are on the back side as shown in FIG. 5A. The separator 10 should be sized such that the outer surfaces of the helical ramps 40, 42 are close enough to the housing 18 (FIGS. 1-3) to prevent flow of material other than within the first flow path 100 or second flow path 102.

It is noted that the term "helical" here should be understood to be a three dimensional path both having a depth and a radial element. Neither the inner nor outer radius of any helical path should be understood to be limited to a constant. Further, each rotation of any helical path may have a constant distance between each turn, or the distance may change at an even or uneven rate.

In addition, while a helical path is shown herein, any path which imparts centrifugal force and velocity to a gas laden solution may encourage separation, and any method of encouraging gas exiting by an uninhibited path is within the spirit of the invention. For example, stacked paths which have polygonal sides that follow a circuitous route may be used.

Figure 6B:
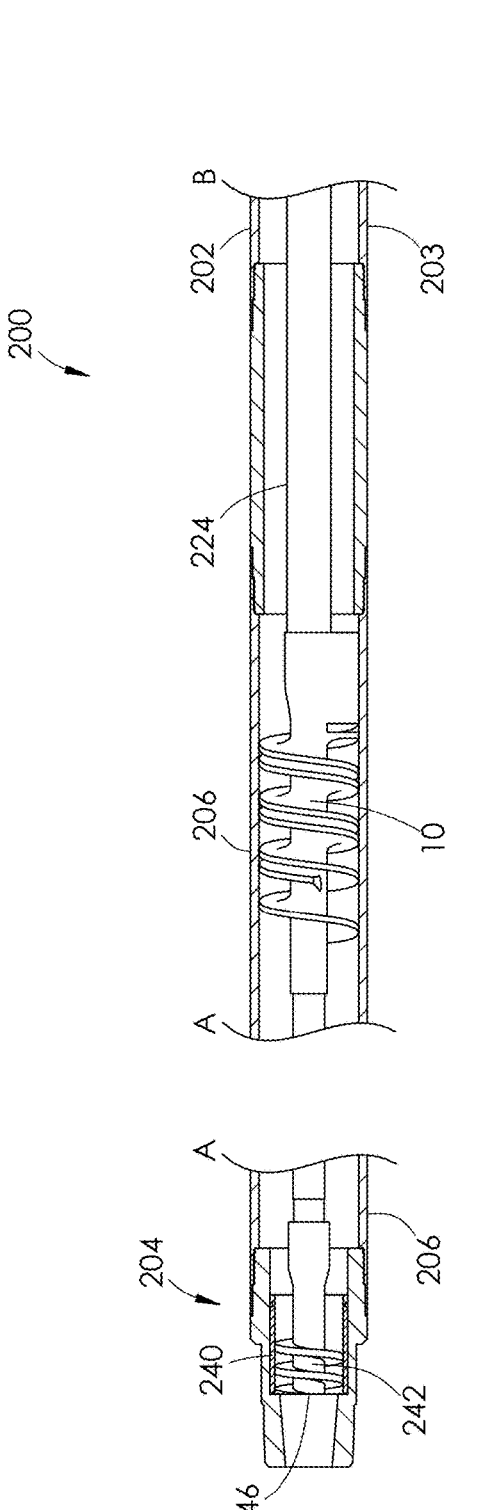
FIG. 6B is a image of the sectional view previously shown in FIG. 6A, with internal components of the separator in side view, and the housing in sectional view.
Figure 6B:
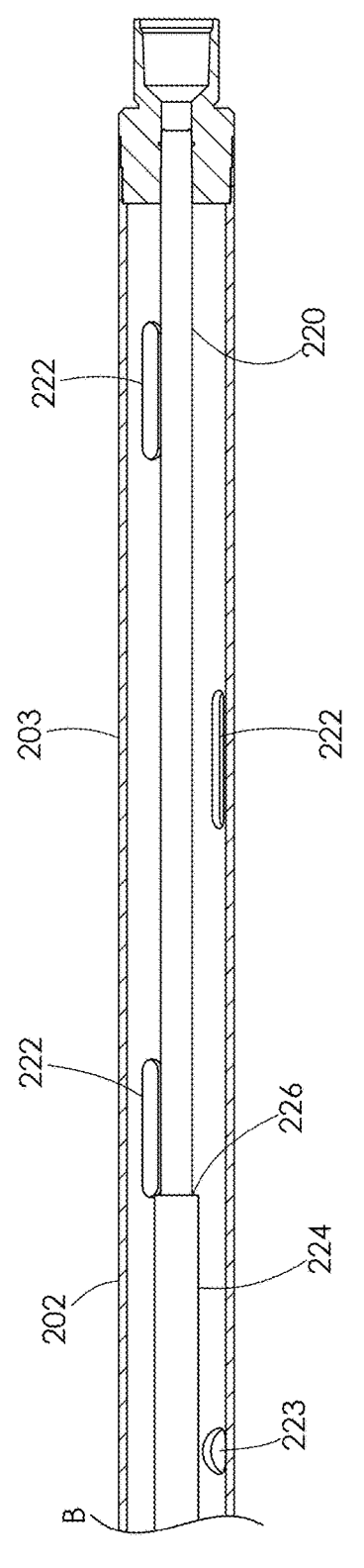

While the system of the spiral separator 10 can be used alone, it may also be used with a larger combined assembly, as shown in FIGS. 6A-6B. For example, a stacked assembly 200 may be utilized with a limited entry separator 202 and the spiral separator 10 of the present invention. In addition, a sand/solids separation unit 204 may be used below these elements.

The limited entry separator 202 comprises a large outer housing 218 with a typically sized inner tube 30, which may be generally referred to for purposes of the stacked assembly, referred to herein as combined separator 200 as dip tube 220. Elongated intake slots 222 of that separator 202 allow flow from the annulus into an inner annulus of the separator 202. Slots 222 and a lowermost intake point 223 are are formed in the outermost wall 203 of the separator 202.

In addition, a piece of intermediate vented tubing 224, which may be stainless steel, encases the dip tube 220 in a concentric fashion. The upper termination point 226 of the intermediate tube 224 is located above the lowermost potential intake point 223 for gassy fluids to enter the separator 202 which is created by three holes drilled in the upper outer housing body and located several inches below the series of slots 222 located above and that stretch nearly to the top end of the outer housing 218.

The separator 202 thus serves as a dedicated gas ventilation annulus for all the free-gas captured and vented out the top end of the spiral separator 10 located immediately below the bottom end of this separator 202.

A lower housing 206 is disposed between the spiral separator 10 and the sand separator 204. This lower housing allows for additional "dead space" to decrease the velocity of fluids traveling through the combined separator assembly 200, allowing for further separation.

The sand/solid separator 204 is a true centrifugal, phase-separating sand and solids separator which incorporates an expendable erosion tube 240 wrapping itself neatly around the outer diameter of the sand spiral vanes 242.

This sand spiral separator 204 is generally of the design found in U.S. Pat. No. 11,603,748, the contents of which are incorporated herein by reference. The advantages of using such a separator 204 are that 1) the flatter and more continuous and lengthy spiral flowpath generated allows longer residence time throughout the unit to allow solids to be aggressively slung outward and more fully segregated from the likely solids laden fluid mixture that is passing through, 2) a "tighter" flowpath is applied with a smaller flowing cross-section such that a higher spinning force is applied to all the solids passing through beyond what is desirable for other more commonly used desander tools and this is totally allowable in this design because the spiral-wrapping erosion tube constructed from hard and thick metal protects the desander mandrel from being damaged and possibly cut through, which could otherwise lead to dropping the tailpipe assembly in the hole, but also could destroy the desander tool itself so the entirety would have to be replaced upon servicing.

The erosion tube 240 is designed to be a sacrificial element and allows fluids to be spun harder to get effective solids mitigation, and the use and placement of flow-restrictive sized fluid entry hole aligned with the bottom-most terminating point of the sand spiral blade 242 allows a strategically proportioned amount of the total flowing fluid volume, yet not all of it, to be easily and smoothly ingested into the intake hole of the dip tube 220, allowing the quickly sweeping solids to continue flowing in the circular and low-siding flow pattern while allowing that bit of fluid to depart cleanly from those spinning solids in an effort to reduce the amount of total fluid that must then make the U-turn into the downward facing intake hole 246 in the bottom facing end of the spiral blade 242. For the separated liquid which reaches the intake hole 246, it performs the function of pump inlet 32, but at a greater distance from the spiral separator 10.

The problem for many units and other separation types is the limitation of wellbore cross-section when operating at high volumes and in well conditions that yield very turbulent and foamy conditions where the gas tends to get highly entrained in the fluid mixture. The separator 202 is not prohibited by wellbore cross-section, but even this type of unit has limitation when slowing down the fluid intake velocity alone does not solve the separation issues fully and when the cost of a very large unit begins to have notable negative effect.

Figure 7:
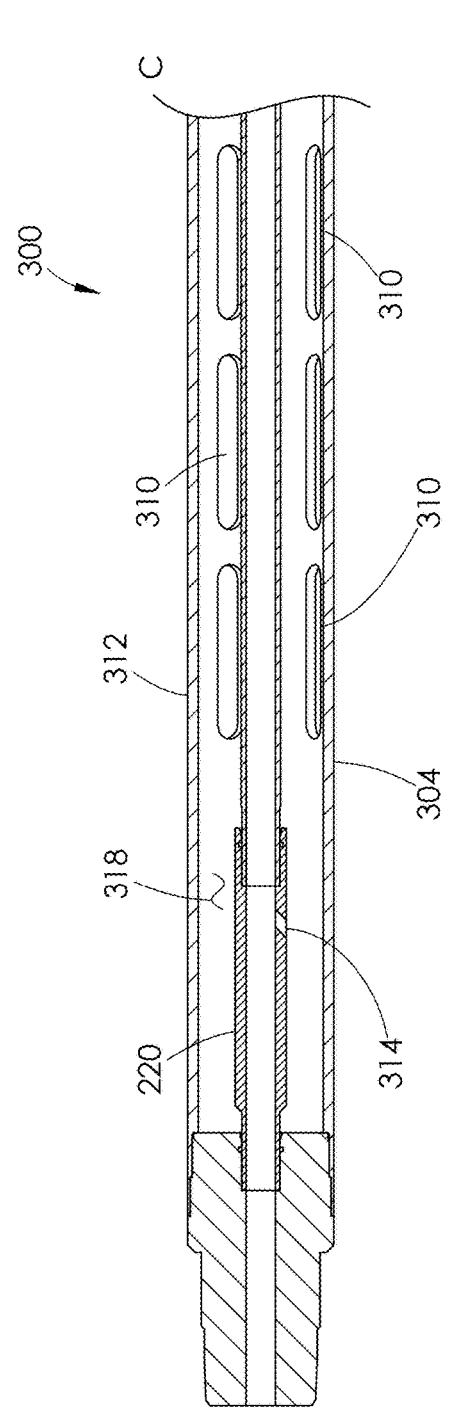
FIG. 7 is a sectional side view of a dual-stage separator assembly for use with the present invention. The apparatus of FIG. 7 should be understood to be just upstream of the apparatus shown in FIGS. 6A-6B, and is truncated at line C-C.
Figure 7:
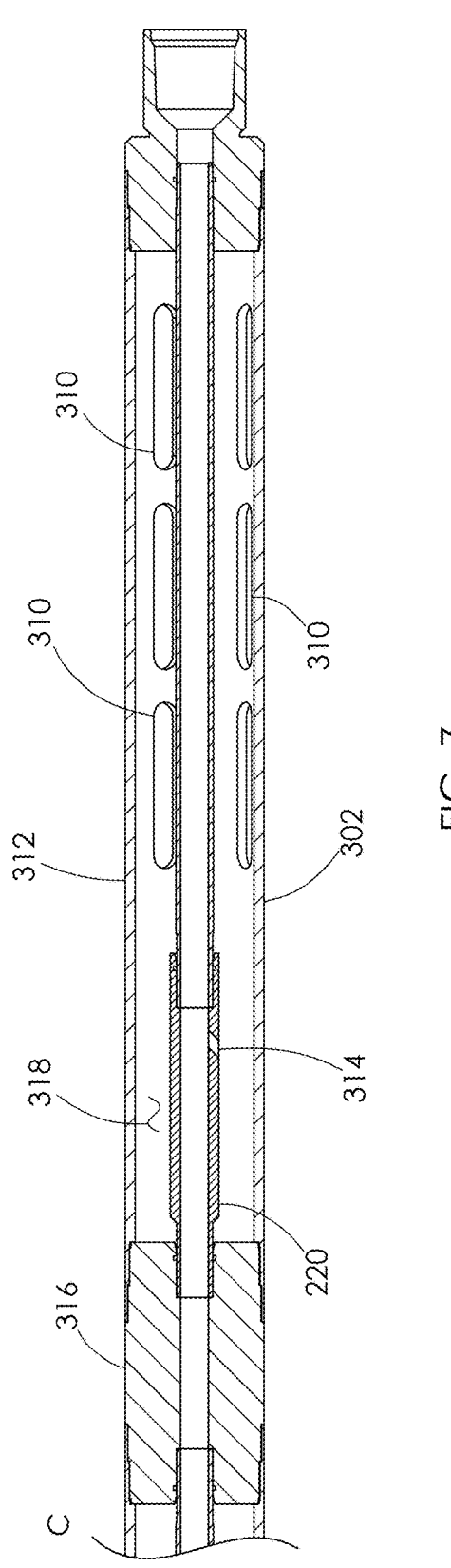

With reference to FIG. 7, a solution to this limitation is shown. Uphole of the separator 202 is a further limited entry type of separator stack 300. The MSLE type of gas separator 300 which controls a limited amount of fluid intake per stage such that the fluid intake velocity potential within each stage is limited by design to keep that drawdown pace at a desirable range for both minimum and maximum speed within each stage's dead-space. A real benefit of this separation type is that it can be easily added in a modular fashion to the top of the combined separator assembly 200 of FIGS. 6A-6B to allow a bit of desired production volume to be ingested through even a limited number of stages 302, 304 which then offloads a bit of the fluid throughput otherwise required to all pass through the singular combined separator assembly 200.

The separator stack 300 comprises a first stage 302 and a second stage 304. While two stages are shown, and tend to be effective, a single stage, or more than two stages may be used. Each stage comprises a number of intake slots 310 formed in an outer housing 312, and a limited entry port 314 formed in the dip tube 220. The stages are joined by a barrier 316 which isolates the annulus 318 of each stage 302, 304. The outer housing 312 may be referred to as a second housing, and is contiguous with the lower housing when the combined stacked assembly 200 is formed.

Thus, in the combined separator assembly 200, when used with an additional separator stack 300, the flow of material in a wellbore is generally like that seen in FIG. 8, which is simplified for ease of understanding.

In FIG. 8, a gas stream 400 is shown using hollow arrows, while a liquid stream 402 is shown using solid arrows. While the streams 400, 402 are shown separately, it should be understood that in most of the portions of the assembly of this invention, liquid and gas are combined, requiring separation. Only at the upper portion of the annulus, designated by annular exit point 410, is the gas largely free of liquid. Likewise, only within the dip tube 220 (both at the entry 32 and ports 314) is the liquid largely free of gas. Arrows showing the streams 400, 402 are therefore representations of the general separation of the apparatus rather than a strict indication.

In FIG. 8, both the gas stream 400 and the liquid stream 402 are disposed in the annulus 20, outside of the housing of the combined separator assembly 200. The combined gas-liquid stream 400, 402 may be ingested at multiple points, including through the outermost wall 203 at slot 222 and slots 310 in the outer housing 312 of the limited entry separator.

Material ingested in separator 202 drops into the spiral separator 10, where it is separated as discussed with reference to FIGS. 1-5. Material may enter and exit the annular region of the separator 202. However, the spiral separator 10, housing 206 and sand separator 204 have no ports allowing material to enter and exit, allowing the separation of the combined separator assembly 200 to occur within the annulus of the separator.

The gas stream 400, separated from the liquid stream 402 by the spiral separator 10, enters the smaller flowpath of the separator 10 and travels into the intermediate vent tube 224. This gas then escapes through slots 310 back into the annulus 20.

The liquid stream 402 which exits the separator 10 drops through housing 206 to the sand separator 204. After exiting the sand separator 204, the liquid 402 enters the dip tube 220 at the inlet 32. While the bottom of the sand separator 204 is shown to be near the pump inlet 32 for clarity, it should be understood that solids, such as sand, may fall a significant distance after leaving the separator 204.

Material ingested into the limited entry separator 300 enters a fluid "dead space", where gas velocities are throttled, allowing liquid to fall to the bottom of each stage 302, 304. Liquid may then enter the dip tube 220 through ports 314. Gas may escape each stage through slots 310. The barrier 316 defines the terminal end of each stage 302, 304, and no gas or liquid may cross any barrier 316.

Thus, the velocity of the gas stream 400 and the liquid stream 402 are disrupted by the circuitous route through the combined separator 200 which is formed by separators 10, 202, 300, causing full separation and allowing ingestion of liquids into the dip tube 220 and gas to travel to the surface through the annulus 20.

This disclosure indicates the various features which may be used with the spiral separator 10 and the arrangement of elements which enables it to work at its best. Alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A separator assembly for use within a wellbore, comprising:
  a first separator, comprising:
    a first tube having an inlet port, wherein the first tube is in communication with a pump;
    a first housing, surrounding the first tube to form a first annular region, the first housing forming the first annular region between the first tube and the first housing, and a second annular region between the first housing and the wellbore, wherein a first port is formed in the first housing between the second annular region and first annular region;

a first spiral ramp disposed within the first annular region; and a second spiral ramp disposed within the first annular region;

wherein the first annular region is defined by:

a first flow path, having a beginning point at the first port and bounded in part by a first helical ramp and a second helical ramp;

a second flow path, distinct from the first flow path, which is bounded in part by the first helical ramp and the second helical ramp and has an endpoint in the second annular region; and a third flow path, which is bounded in part by the first helical ramp and ends at the inlet port; and a second separator, disposed adjacent to the first separator, comprising:

a second housing, contiguous with the first housing and surrounding the first tube, wherein an annulus is defined between the first tube and the second housing;

wherein:

a plurality of separator stages are formed within the annulus between the first tube and the second housing, in series, and each separator stage is defined by at least one entry port which communicates fluid from the annulus into the first tube;

at least one entry port of at least one of the plurality of separator stages has less cross-sectional area than at least one entry port of another one of plurality of the separator stages; and the second housing is defined by a plurality of intake openings, each of the plurality of intake openings interconnecting the second annular region and the annulus between the first tube and the second housing, and wherein each of the plurality of separator stages includes at least one of the plurality of intake openings.

2. The separator assembly of claim 1 in which the beginning point of the first flow path is downhole of the ending point of the second flow path.

3. The separator assembly of claim 1 further comprising an intermediate tube surrounding the first tube, the intermediate tube forming a portion of the second flow path.

4. The separator assembly of claim 1 in which material along the third flow path has a higher concentration of liquid than material along the second flow path.

5. The separator assembly of claim 1 further comprising a sand separator, in which the third flow path extends through the sand separator.

6. The separator assembly of claim 5 in which the sand separator comprises at least one spiral blade.

7. A system comprising:

a production string;

the separator assembly of claim 1 disposed on the production string; and a wellbore fluid disposed in the second annular region, the wellbore fluid comprising a liquid portion and an entrained gas portion;

wherein:

a first portion of the wellbore fluid is configured to enter one or more stages of the second separator through the one or more intake openings; and a second portion of the wellbore fluid is configured to enter the first separator through the first port.

8. The system of claim 7 in which the second portion of the wellbore fluid is configured to travel the first flowpath such that a gaseous section of the second portion separates from a liquid section of the second portion.

9. The system of claim 8 in which the gaseous section of the second portion travels the second flowpath.

10. The system of claim 7 in which the first portion of the wellbore fluid is separated into a gaseous section of the first portion and a liquid section of the first portion within the one or more stages of the second separator.

11. The system of claim 10 in which the liquid section of the first portion enters the first tube at the at least one entry port.

12. The system of claim 11 in which the gaseous section of the first portion travels from the annulus between the first tube and the second housing to the second annular region through the one or more intake openings.

13. A separator assembly configured for disposal within a wellbore having an uphole direction and a downhole direction, the separator assembly comprising:

an inner tube;

an outer housing surrounding the inner tube, defining a first annular region between the outer housing and the inner tube and a second region outside the outer housing, the outer housing having a plurality of slots between the first annular region and the second region;

a first separator disposed within the first annular region, and in fluid communication with the second region through a first set of the plurality of slots, the first separator comprising a first spiral ramp and a second spiral ramp disposed within the first annular region, wherein the first spiral ramp and the second spiral ramp are configured for placement on a downhole side of the first set of the plurality of slots;

a second separator comprising:

a first stage disposed within the first annular region and in fluid communication with the second region through a second set of the plurality of slots and comprising a first tube inlet allowing fluid communication between the first annular region and the inner tube, wherein the first tube inlet is configured for placement on an uphole side of the first set of the plurality of slots; and a second stage disposed within the first annular region and in fluid communication with the second region through a third set of the plurality of slots and comprising a second tube inlet allowing fluid communication between the first annular region and the inner tube, wherein the second tube inlet is configured for placement on an uphole side of the second set of the plurality of slots.

14. The separator assembly of claim 13 wherein the inner tube terminates at a third tube inlet within the first separator, wherein the third tube inlet is configured for placement on a downhole side of the first spiral ramp and the second spiral ramp.

15. The separator assembly of claim 13 wherein the first separator further comprises:

a sand separator assembly disposed on a downhole side of the first spiral ramp, the sand separator assembly comprising a spiral blade.

16. A separator assembly for use in a wellbore comprising:

a first separator disposed between a first tube and a second tube, the first separator comprising a spiral ramp assembly comprising a first ramp and a second ramp, wherein the first separator defines:

a first flow path, bounded in part by the first ramp and the second ramp;

a second flow path, distinct from the first flow path, which is bounded in part by the first ramp and the second ramp and has an endpoint in the second annular region and containing the first gas portion; and a third flow path, which is bounded in part by the first ramp and ends at an inlet port of the first tube;

wherein the first separator is configured to:

separate a first gas portion and a first liquid portion of a wellbore fluid at the first flow path;

place the first liquid portion into the first tube at an end of the third flow path; and release the gas portion to a position outside the second tube at an end of the second flow path; and a second separator disposed between the first tube and the second tube, the second separator comprising a plurality of stages, each stage defining a port in the first tube and a port in the second tube, wherein each stage is separated by a barrier, the barrier preventing flow between each of the plurality of stages, each of the plurality of stages configured to separate the wellbore fluid into a second gas portion and a second liquid portion.

17. The separator assembly of claim 16 wherein the second separator comprises two stages.

18. The separator assembly of claim 16 in which the port in the first tube is a limited entry port.

19. A method of using the separator assembly of claim 16, comprising:

placing the separator assembly in a wellbore;

intaking the wellbore fluid into the first separator and the second separator;

at the first separator:

separating the wellbore fluid into the first liquid portion and the first gas portion;

ingesting the first liquid portion into the first tube; and releasing the first gas portion at the position outside the second tube; and at the second separator:

separating the wellbore fluid into the second gas portion and the second liquid portion;

releasing the second gas portion from the port in the second tube; and ingesting the second liquid portion into the first tube at the port in the first tube.

\* \* \* \* \*